H. W. HUDDLESON.
PIE PLATE.
APPLICATION FILED JAN. 14, 1910.
982,065.
Patented Jan. 17, 1911.
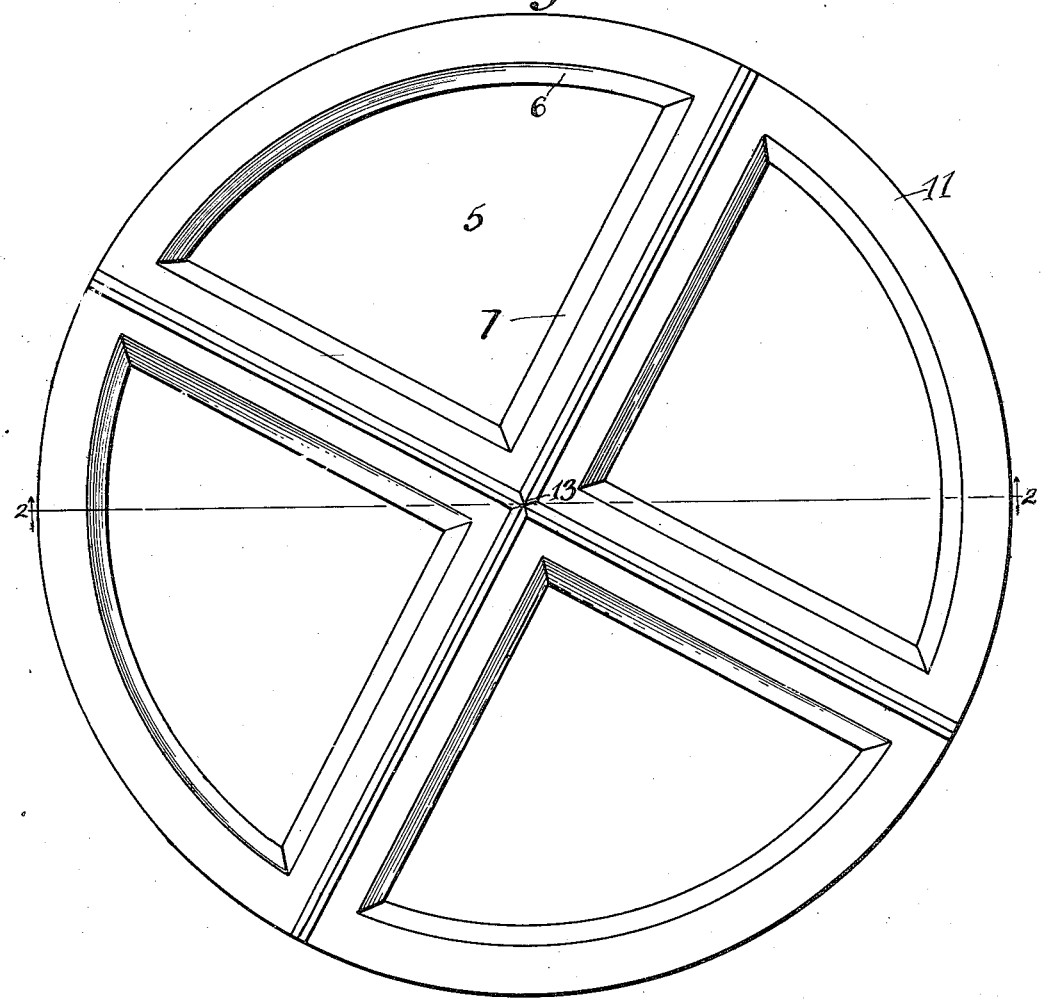
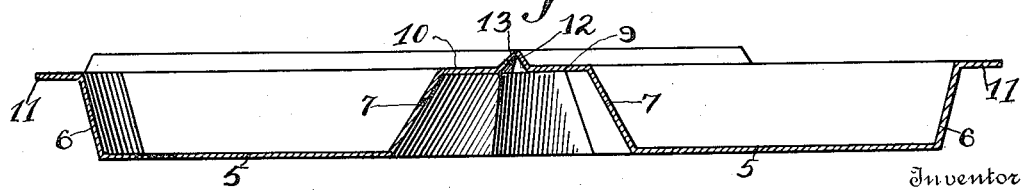
Inventor
Harvey W. Huddleson
By Victor J. Evans
Attorney
Witnesses
Wm S. McDowell
K. Allen

UNITED STATES PATENT OFFICE.

HARVEY W. HUDDLESON, OF WASHINGTON, DISTRICT OF COLUMBIA.

PIE-PLATE.

982,065.  Specification of Letters Patent.  Patented Jan. 17, 1911.

Application filed January 14, 1910. Serial No. 538,091.

*To all whom it may concern:*

Be it known that I, HARVEY W. HUDDLESON, a citizen of the United States, residing at Tenleytown, Washington, District of Columbia, have invented new and useful Improvements in Pie-Plates, of which the following is a specification.

This invention relates to improvements in cooking utensils and has particular reference to pie plates.

It has for one of its objects the provision of a pie plate comprising a plurality of sector-shaped compartments, each compartment corresponding in size to the size of a sector of a pie when the latter is quartered whereby an entire pie may be baked, and when so baked each sector or piece of pie may be removed therefrom without disturbing the remainder of the sectors or pieces.

Another object is the provision of a construction whereby the lower pie crust will cover the straight sides of the sector, so that when the latter is removed from the compartment its entire surface will be sealed with crust similar to a circular pie when removed from its plate, so that the ingredients covered by the crusts will not escape.

A further object is the provision of a pie plate, the sides of the compartments of which are flanked by ridges adapted to penetrate through the top and bottom crusts when the latter has been placed thereover.

With these and other objects in view as will more fully hereinafter appear, the present invention consists of certain novel details of construction, arrangement of parts, hereinafter fully described, illustrated in the accompanying drawings and more particularly pointed out in the appended claim, it being understood that various changes in the form, proportion, size and minor details of construction may be made within the scope of the appended claim without departing from the spirit or sacrificing any of the advantages of the invention.

In the accompanying drawings forming a part of the specification:—Figure 1 is a plan view of the device. Fig. 2 is a transverse sectional view taken on the line 2—2 of Fig. 1.

Similar numerals of reference are employed to designate corresponding parts throughout.

As shown in Fig. 1, the plate comprises four sector shaped compartments. It must be understood, however, that I am not to be limited to this specific number of compartments as will be understood from what will appear later, that a greater or even a less number of compartments might be formed without departing from the spirit or sacrificing any of the advantages of the invention. The pie plate about to be described may be stamped from a single sheet of metal or the compartments may be formed of separate sheets soldered or otherwise secured together. When the plate is constructed of separately made compartments each compartment is stamped from a single sheet of suitable metal.

By reference to Figs. 1 and 2, it will be seen that each sector comprises a bottom plate 5 corresponding in contour to the shape of a sector and from the straight and curved sides of which rise the straight walls 7 and the curved wall 6. These walls incline outwardly from the bottom 5, and adjacent to their upper sides, the walls 7 are inclined laterally and upwardly, as shown at 9 and 10. The curved wall 6 is, adjacent to its outer side, likewise bent outwardly and parallel with the bottom 5, as shown at 11. The laterally and upwardly bent portions 9 and 10 of the straight walls 7 are somewhat less in width than the outwardly bent portion 11 and terminate in upwardly and outwardly inclined flanges 12 and 13. The flanges 12 and 13 extend considerably above the plane of the outwardly bent portion 11 of the curved wall 6, as clearly shown in the drawings. By virtue of this construction, when the edges of the upwardly and outwardly inclined flanges 12 and 13 are soldered or otherwise secured to the corresponding upwardly and outwardly inclined flanges of the two adjacent compartments, it will be evident that a triangular shaped ridge will be provided, the edge of which will be considerably above the plane of the outwardly bent portion 11 of the curved side wall 6.

In the formation of a pie to be cooked in my improved device, the bottom crust is first placed over the entire face of the plate after which it is worked downwardly into the compartments to bear on the bottoms 5, walls 6 and 7 and the bearing flanges 9, 10 and 11 and thence over the opposite sides of the ridges. When the bottom crust is so placed the compartments are filled with the fruit or other substance, to a level with the upper sides of the walls, or approximately so; after this has been done the top crust is placed over the compartments and their contents.

It will be remembered that the bearing flanges 11 of the curved walls 6 are below the planes of the ridges, so that when the top crust has been placed over the compartments and their contents, as before stated, the portion of the crust bearing on the ridges may be worked downwardly on the opposite sides of the ridges to bear on the bottom crust which bears on the flanges 9 and 10. With this construction it will be evident that when the top and bottom crusts are severed by the ridges before baking, that the straight edges of the crusts will be forced one into the other so that when the pie is baked these edges will be completely sealed. It will be evident since the curved flange 11 is not provided with a ridge, a knife or other implement may be readily inserted between the said flange and the lower pie crust, and the sector of pie removed from the compartment in a comparatively easy manner and without the danger of breaking the sector.

From the foregoing it will be seen that I have provided a device of this character which is comparatively simple in construction, inexpensive to manufacture, and embodying few parts, and these so arranged that the danger of the derangement will be reduced to a minimum.

Having thus described the invention, what I claim as new, is:—

A pie baking plate comprising a plurality of sector-shaped compartments each of which includes a plane bottom from the straight sides of which rise outwardly inclined walls and from the curved side of which rises an outwardly inclined curved wall, the said straight walls terminating in outwardly extending straight flanges, and the curved wall terminating in an outwardly curved flange, the said straight flanges ending in upwardly and outwardly inclined extensions rising above the plane of the curved flange and secured to corresponding upwardly and outwardly inclined portions on the straight flanges of adjacent compartments, whereby ridges are provided, for the purpose described.

In testimony whereof I affix my signature in presence of two witnesses.

HARVEY W. HUDDLESON.

Witnesses:
 B. A. BOWLES,
 C. W. SHOEMAKER.